April 27, 1948.  B. W. HARGROVE  2,440,269
TUNABLE OSCILLATOR
Filed Sept. 20, 1944  2 Sheets-Sheet 1

INVENTOR.
BERTHAL W. HARGROVE
BY William D. Hall.
ATTORNEY

April 27, 1948.    B. W. HARGROVE    2,440,269
TUNABLE OSCILLATOR
Filed Sept. 20, 1944    2 Sheets-Sheet 2

INVENTOR
BERTHAL W. HARGROVE
BY William D. Hall
ATTORNEY

Patented Apr. 27, 1948

2,440,269

UNITED STATES PATENT OFFICE 2,440,269

TUNABLE OSCILLATOR

Berthal W. Hargrove, Mayfield, Ky.

Application September 20, 1944, Serial No. 554,927

2 Claims. (Cl. 250—36)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to tuning arrangements and more particularly to a novel variable capacitor therefor of use with oscillators, and the like.

The objects of the present invention include the provision of a novel variable capacitor that provides a low minimum capacity, low stray inductance and a high ratio between maximum and minimum capacity.

With the above and other objects in view, which will be apparent to those who are familiar with capacitors and the like from the following description, illustrative embodiments of the present invention are shown in the accompanying drawings wherein.

Figure 1:
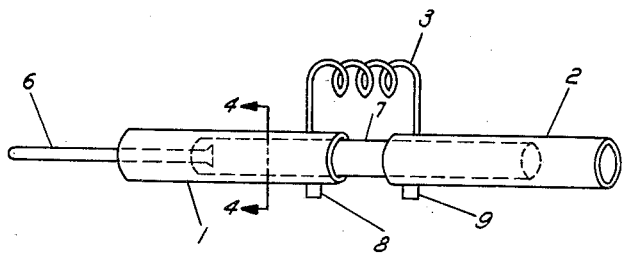
Fig. 1 is a perspective view of one embodiment of the present invention.
Figure 2:
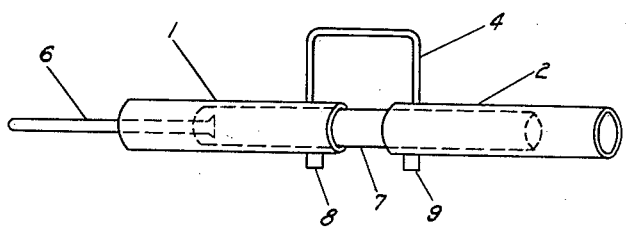
Fig. 2 is a perspective view of a second embodiment of the present invention.
Figure 3:
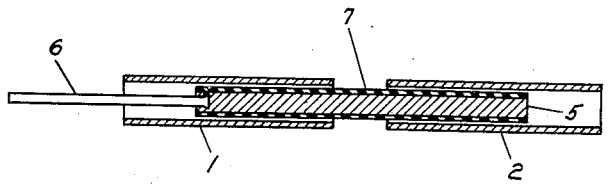
Fig. 3 is a sectional view taken longitudinally of the construction that is shown in Fig. 1.
Figure 4:
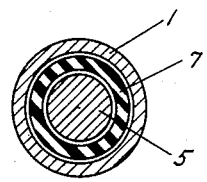
Fig. 4 is a sectional view taken along the line 4—4 in Fig. 1.

The present invention comprises an arrangement for varying the capacity in an LC circuit which comprises a pair of substantially aligned hollow cylindrical conductors 1 and 2 that have spaced ends connected thru a suitable inductor that may be a coil 3, a loop 4, or other suitable conductor bridging inductance part of the device.

A plunger member 5 is preferably disposed inwardly of and extends substantially longitudinally of the cylindrical conductors 1 and 2. The plunger member 5 may be hollow or solid as preferred and is provided with suitable handles 6 by which the plungers 5 are moved longitudinally of the conductors 1 and 2. The member 5 bridges the space between the conductors 1 and 2 and is maintained in substantially coaxial relation therewith by suitable means, such as by a spacing dielectric hollow cylinder 7, rings, pins, or the like. Contacts 8 and 9 are provided for attaching connecting wires or the like, to the cylinders 1 and 2 respectively.

In operation the condenser that is disclosed herein provides a maximum condenser action when the opposite ends of the plunger 5 are substantially equi-distant from the spaced ends of the two outer conductors 1 and 2. The device provides a minimum or residual condenser action when an end of the plunger 5 is substantially flush with one of the spaced ends of the conductors 1 or 2. In the present construction the residual condenser action is reduced to a negligible value. The coil 3, or the loop 4, functions as an inductance.

Figure 5:
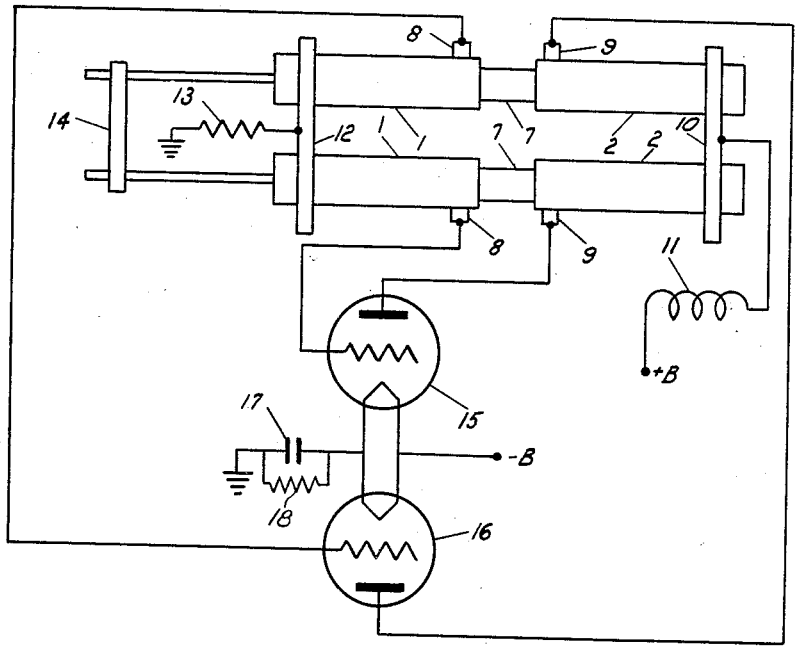
Fig. 5 is a perspective view of another embodiment of the present invention.

An oscillator type arrangement of the present device is shown in Fig. 5 of the accompanying drawings. In this arrangement an adjustable shorting bar 10 bridges a substantially parallel pair of the conductors 2 and is connected thru an RF choke coil 11 to the positive terminal of a B battery, as shown. Choke 11 keeps out of the B battery circuit any residual radio frequency currents which might result from a slight unbalance in the plate load circuit. Another adjustable shorting bar 12 bridges the aligned pair of conductors 1 and is grounded thru a resistor 13 to prevent excessive grid currents. The handles 6 are non-conducting in both this arrangement and in the previously disclosed form of the device, and are bridged by an insulating bar 14 that is attached thereto and that maintains their positions with respect to each other. The spaced ends of the aligned pairs of conductors 1 and 2 are connected thru push-pull triodes 15 and 16. The conductor 1 of each condenser unit is connected to the grid of one of the triodes and the conductor 2 of that unit is connected to the plate of the same triode. The filaments of the triodes 15 and 16 are connected together and with the negative terminal of the B battery on one side and thru a capacitor 17 to ground on the opposite side of the triode filaments. Capacitor 17 is shunted by a grid leak resistor 18.

The operation of the device that is shown in Fig. 5 is analagous to that of the form of the device that was shown in the other figures of the drawings and of a usual oscillator but is characterized by improved characteristics thereover. Each pair of conductors 1 and 2 constitutes a lecher line, with the conductors of one line in end-to-end relation with the conductors of the other line. Movement of conductor 7 varies the feedback between the plates and grids to provide adjustment of the oscillator output, as well as a slight frequency adjustment.

It is to be understood that the forms of the device that are shown in the accompanying drawings and described in the specification have been cited for the purposes of illustrating and describing the present invention and that various modifications may be substituted for the parts and components thereof without departing from the present invention as defined by the appended claims.

What I claim is:

1. A tunable, push-pull oscillator circuit comprising a pair of electron tubes each having at least an anode, a cathode and a grid, a first lecher line having a pair of spaced, parallel conductors respectively connected to the grids of said tubes, a second lecher line having a pair of spaced, parallel conductors respectively connected to the anodes of said tubes, a shorting bar on said first lecher line connected to said cathodes, a shorting bar on said second transmission line connected to said cathode in series with a source of plate current, said lecher lines being aligned in end-to-end relation, and a movable metallic element capacitatively coupling each conductor of said first lecher line with an aligned conductor of said second lecher line, said metallic element overlapping only a portion of each line.

2. An oscillator circuit as set forth in claim 1, wherein said lecher line conductors are hollow tubes, and wherein said metallic element is movable within said tubes.

BERTHAL W. HARGROVE.

REFERENCES CITED

The following references are of record in the file of this patent:

UNITED STATES PATENTS

| Number | Name | Date |
|---|---|---|
| 1,589,204 | Miller et al. | June 15, 1926 |
| 1,683,130 | Gebhard | Sept. 4, 1928 |
| 1,980,158 | Hansell | Nov. 6, 1934 |
| 2,137,435 | Yolles | Nov. 22, 1938 |

FOREIGN PATENTS

| Number | Country | Date |
|---|---|---|
| 252,285 | Great Britain | May 27, 1926 |
| 440,950 | Great Britain | Jan. 6, 1936 |